US007993618B2

(12) United States Patent
Li et al.

(10) Patent No.: US 7,993,618 B2
(45) Date of Patent: Aug. 9, 2011

(54) METHOD FOR MAKING METAL OXIDE NANOCRYSTAL

(75) Inventors: Ya-Dong Li, Beijing (CN); Ding-Sheng Wang, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 396 days.

(21) Appl. No.: 11/982,666

(22) Filed: Nov. 2, 2007

(65) Prior Publication Data

US 2008/0241054 A1    Oct. 2, 2008

(30) Foreign Application Priority Data

Mar. 30, 2007 (CN) .......................... 2007 1 0073764

(51) Int. Cl.
| | |
|---|---|
| *C01F 17/00* | (2006.01) |
| *C01B 13/14* | (2006.01) |
| *C01G 9/02* | (2006.01) |
| *C01G 53/04* | (2006.01) |
| *C01G 45/02* | (2006.01) |

(52) U.S. Cl. ................ 423/263; 423/592.1; 423/594.19; 423/605; 423/622

(58) Field of Classification Search ............... 423/594.3, 423/594.4, 599, 622; 502/300–304, 509; 977/811
See application file for complete search history.

(56) References Cited

OTHER PUBLICATIONS

Chunwen Sun et al., "Controlled synthesis of CeO2 nanorods by a solvothermal method", (2005), Institute of Physics Publishing/Nanotechnology, 16, 1454-1463.*
Ru Yang et al., "Synthesis of cubic fluorite CeO2 nanowires", (2005), Journal of Materials Science, 40, 1305-1307.*
Sun, Chunwen, Li, Hong, Zhang, Huairuo, Wang, Zhaoxiang, and Chen, Liquan, "Controlled Synthesis of CeO2 Nanorods by a Solvothermal Method," Jun. 29, 2005, IOP Publishing Ltd, Nanotechnology 16, 1454-1463.*

* cited by examiner

*Primary Examiner* — Stanley Silverman
*Assistant Examiner* — Justin Bova
(74) *Attorney, Agent, or Firm* — Jeffrey T. Knapp

(57) ABSTRACT

A method for making the metal oxide includes the following steps: mixing a metal nitrate with a solvent of octadecyl amine, and achieving a mixture; agitating and reacting the mixture at a reaction temperature for a reaction period; cooling the mixture to a cooling temperature, and achieving a deposit; and washing the deposit with an organic solvent, drying the deposit at a drying temperature and achieving a metal oxide nanocrystal. The present method for making a metal oxide nanocrystal is economical and timesaving, and has a low toxicity associated therewith. Thus, the method is suitable for industrial mass production. The metal oxide nanocrystal material made by the present method has a readily controllable size, a narrow size distribution, and good crystallinity.

19 Claims, 5 Drawing Sheets

METHOD FOR MAKING METAL OXIDE NANOCRYSTAL

BACKGROUND

1. Field of the Invention

The present invention relates to a method for making nanocrystal and, particularly, to a method for making metal oxide nanocrystal.

2. Discussion of Related Art

Nanocrystals are defined as nanometer sized, single crystalline fragments of the corresponding bulk crystals. The term "nanometer-sized" is typically used to refer to particles with an approximate size range between about 1 nanometer (nm) to about 1000 nm in diameter. More typically, "nanometer-sized" refers to an approximate size rang between about 1 nm-100 nm in diameter. Metal oxide nanocrystals play important roles in many different branches of science and technology, such as catalyzer material, lithium cell, and electronic and optical devices.

Synthesis of high quality metal oxide nanocrystals has a critical role in this very active field. The conventional method includes metal organic salt reduction method, hydro-thermal method, and sol-gel method. However, the metal organic salt reduction method requires the use of metal precursors, which are extremely toxic, expensive, and unstable at room temperature, the hydro-thermal method is restricted by product apparatus, and the sol-gel method is not good at control of the size and the size distribution of nanocrystal.

However, there is ongoing demand for a simple, timesaving, low toxic, easy for mass product method for making metal oxide nanocrystal with good size control, narrow size distribution, and good crystallinity.

SUMMARY OF THE INVENTION

A method for making the metal oxide nanocrystal includes the following steps: mixing a metal nitrate with a solvent of octadecyl amine, and achieving a mixture; agitating and reacting the mixture at a reaction temperature for a reaction period; cooling the mixture to a cooling temperature, and achieving a deposit; and washing the deposit with a organic solvent, drying the deposit at a drying temperature and achieving a metal oxide nanocrystal.

Compared with the conventional method, with the inorganic metal salt and octadecyl amine as the raw material, the present method for making metal oxide nanocrystal is economical, timesaving and low toxic, and thus is suitable for industrial mass production. The metal oxide nanocrystal made by the present method has good size control, narrow size distribution and good crystallinity, and therefore has significant advantages for applications in catalysis, ceramics, energy storage, magnetic data storage, sensors, ferrofluids, etc.

BRIEF DESCRIPTION OF THE DRAWINGS

Many aspects of the present method can be better understood with reference to the following drawings. The components in the drawings are not necessarily to scale, the emphasis instead being placed upon clearly illustrating the principles of the present method.

The exemplifications set out herein illustrate at least one preferred embodiment of the present method, in one form, and such exemplifications are not to be construed as limiting the scope of the invention in any manner.

DETAILED DESCRIPTION OF PREFERRED EMBODIMENTS

Reference will now be made, in detail, to the drawings to describe embodiments of the present method.

One method for making the metal oxide includes the following steps: mixing 0.1-1 gram (g) of a metal nitrate with about 10 milliliters (ml) of octadecyl amine, and forming a mixture; agitating and reacting the mixture at a temperature of 120-300° C. for a period of 1-60 minutes (m); cooling the mixture to a temperature of 70-90° C., and achieving a deposit; washing the deposit with an organic solvent such as ethanol, drying the deposit at a temperature of 40-80° C., and finally achieving a metal oxide nanocrystal with a diameter of 10-200 nanometers (nm).

Another method for making the metal oxide includes the following steps: mixing 0.1-1 g of a metal nitrate with 10 ml octadecyl amine as solvent, and forming a mixture; agitating and reacting the mixture at a temperature of 120-300° C. for a period of 1-5 m, and achieving a reactant; filling the reactant into a reaction chamber, and crystallising the reactant at a temperature of 180-220° C. for a period of 20-24 hours (h); cooling the reactant to a temperature of 70-90° C., and achieving a deposit; washing the deposit with an organic solvent such as ethanol, dry the deposit at a temperature of 40-80° C., and finally achieving a metal oxide nanocrystal with a diameter of 10-200 nm. In the present method, the crystallising step is an alternative step, which can make the morphology of the nanocrystal more perfect.

A change to the reaction condition of the present method can influence the morphology and the size of the metal oxide. A concentration of the mixture with the metal nitrate and octadecyl amine has an influence on the morphology of the metal oxide nanocrystal, for example, a grain-shaped metal oxide nanocrystal is easily achieved with a lower concentration, and a stick-shaped metal oxide nanocrystal is easily achieved with a higher concentration. The reaction period and reaction temperature has an influence on the size of the metal oxide nanocrystal, for example, a stick-shaped (i.e., oblong) metal oxide with a smaller diameter is easily achieved with a higher reaction temperature, and a shorter reaction period.

The present method is further illustrated by the following examples, which are not to be construed in any way as imposing limitation upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present method or the scope of the appended claims.

EXAMPLE 1

Figure 1:
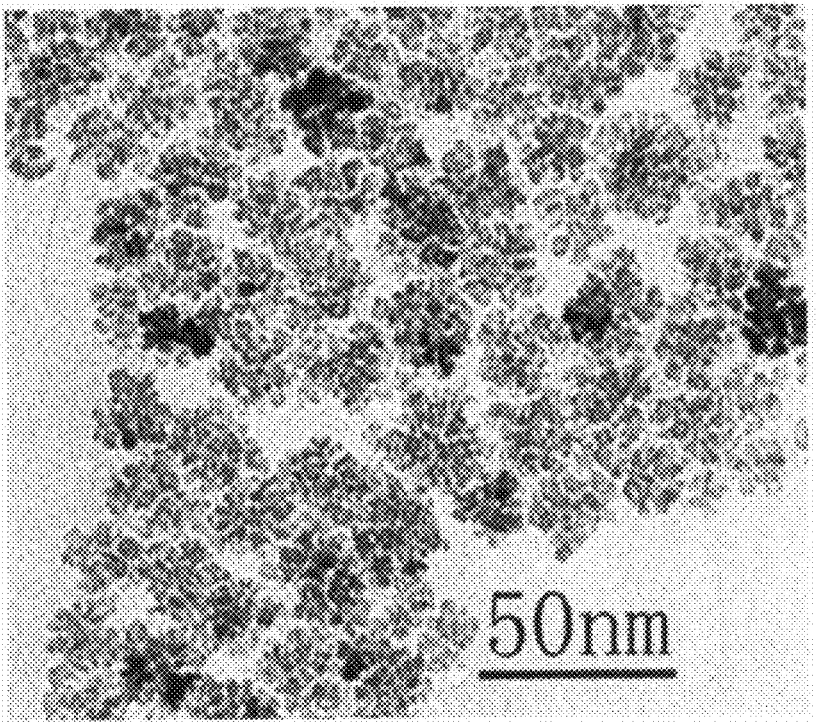
FIG. 1 is a transmission electron microscope (TEM) image of nickel oxide nanocrystal according to a first embodiment.

One gram of nickel nitrate ($Ni(NO_3)_2 \cdot 6H_2O$) solid is dissolved in 10 milliliters (ml) octadecyl amine, and a mixture is achieved. The mixture is agitated and reacted at a temperature of 180° C. for 10 m and then is cooled to the temperature of 80° C., and a deposit is achieved. The deposit is washed with ethanol and dried at the temperature of 60° C. Referring to FIG. 1, a nickel oxide (NiO) nanocrystal with a diameter of about 20 nm is achieved.

EXAMPLE 2

Figure 2:
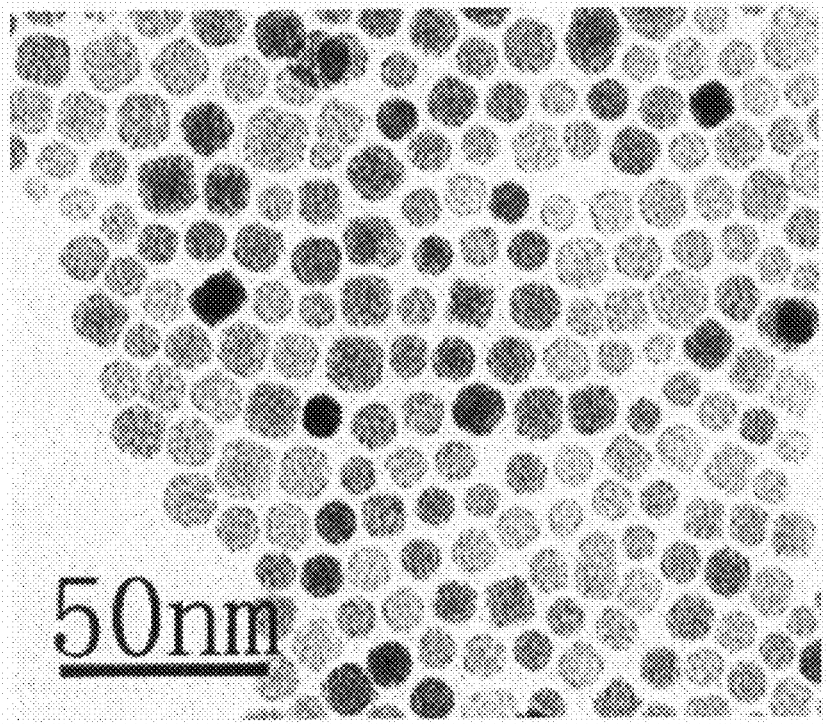
FIG. 2 is a TEM image of mangano-manganic oxide nanocrystal according to a second embodiment.

0.1 ml of manganous nitrate ($Mn(NO_3)_2$) (i.e., manganese (II) nitrate) solution with 50% is mixed in 10 ml octadecyl amine, and a mixture is achieved. The mixture is agitated and reacted at the temperature of 200° C. for 10 m and then is cooled to the temperature of 80° C., and a deposit is achieved. The deposit is washed with ethanol and dried at the temperature of 60° C. Referring to FIG. 2, a mangano-manganic oxide ($Mn_3O_4$) nanocrystal with a diameter of about 10 nm is achieved.

EXAMPLE 3

Figure 3:
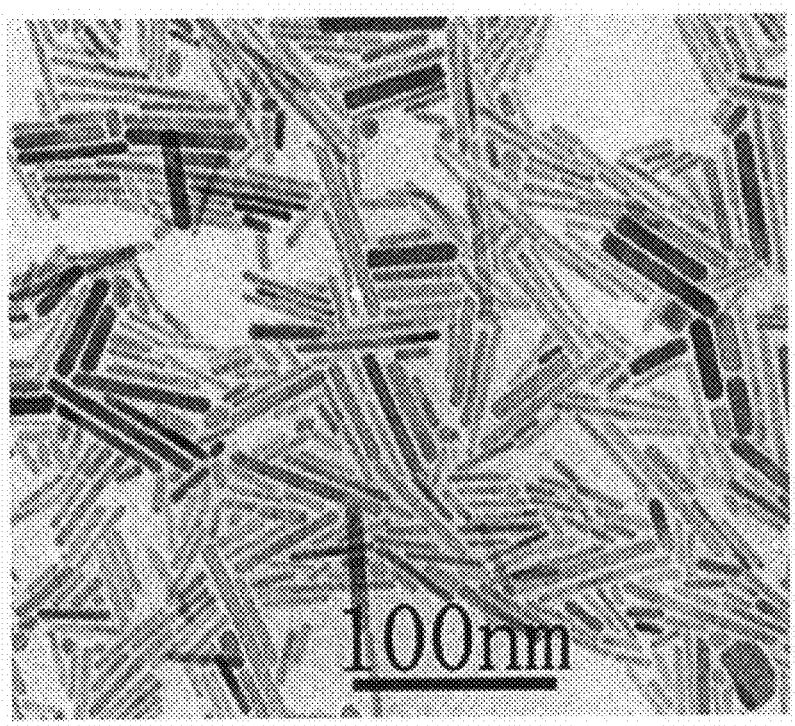
FIG. 3 is a TEM image of mangano-manganic oxide nanocrystal according to a third embodiment.

1 ml of manganous nitrate ($Mn(NO_3)_2$) solution with 50% is mixed in 10 ml octadecyl amine, and a mixture is achieved. The mixture is agitated and reacted at a temperature of 200° C. for 10 m and then is cooled to the temperature of 80° C., and a deposit is achieved. The deposit is washed with ethanol and dried at the temperature of 60° C. Referring to FIG. 3, a mangano-manganic oxide ($Mn_3O_4$) nanocrystal with a diameter of about 6 nm is achieved.

EXAMPLE 4

Figure 4:
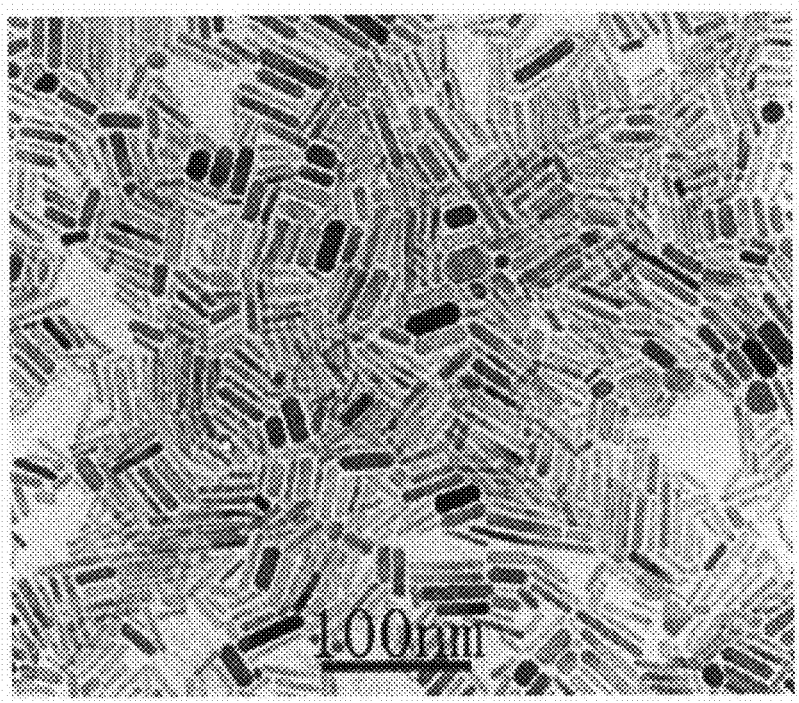
FIG. 4 is a TEM image of mangano-manganic oxide nanocrystal according to a fourth embodiment.

3 ml of manganous nitrate ($Mn(NO_3)_2$) solution with 50% is mixed in 10 ml octadecyl amine, and a mixture is achieved. The mixture is agitated and reacted at a temperature of 220° C. for 1 m and then is cooled to the temperature of 80° C., and a deposit is achieved. The deposit is washed with ethanol and dried at the temperature of 60° C. Referring to FIG. 4, a mangano-manganic oxide ($Mn_3O_4$) nanocrystal with a length of about 30 nm and a width of about 6 nm is achieved.

EXAMPLE 5

Figure 5:
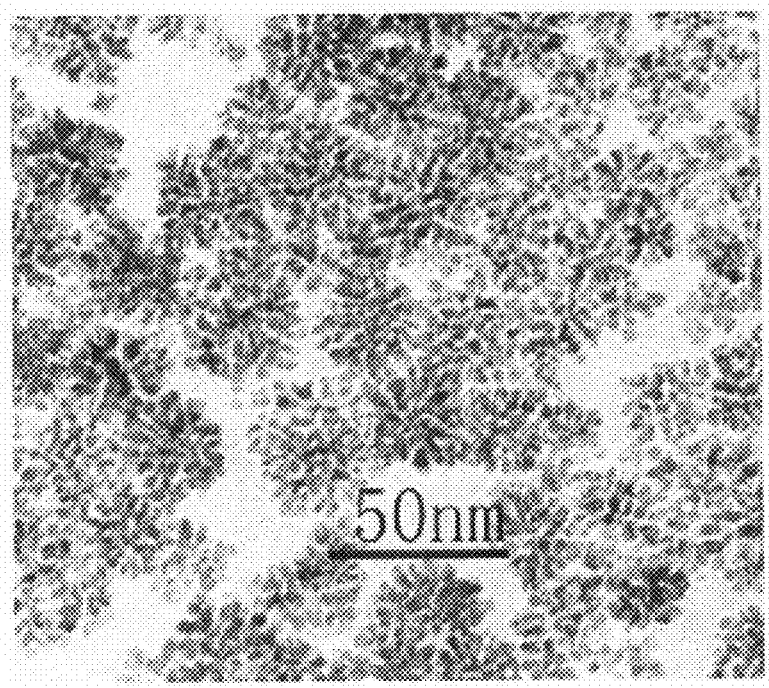
FIG. 5 is a TEM image of cerium dioxide nanocrystal according to a fifth embodiment.

1 g of cerium nitrate ($Ce(NO_3)_3 \cdot 6H_2O$) solid is dissolved in 10 milliliters (ml) octadecyl amine, and a mixture is achieved. The mixture is agitated and reacted at a temperature of 250° C. for 8 m and then is cooled to the temperature of 80° C., and a deposit is achieved. The deposit is washed with ethanol and dried at the temperature of 60° C. Referring to FIG. 5, a cerium dioxide ($CeO_2$) nanocrystal with a diameter of about 30 nm is achieved.

EXAMPLE 6

Figure 6:
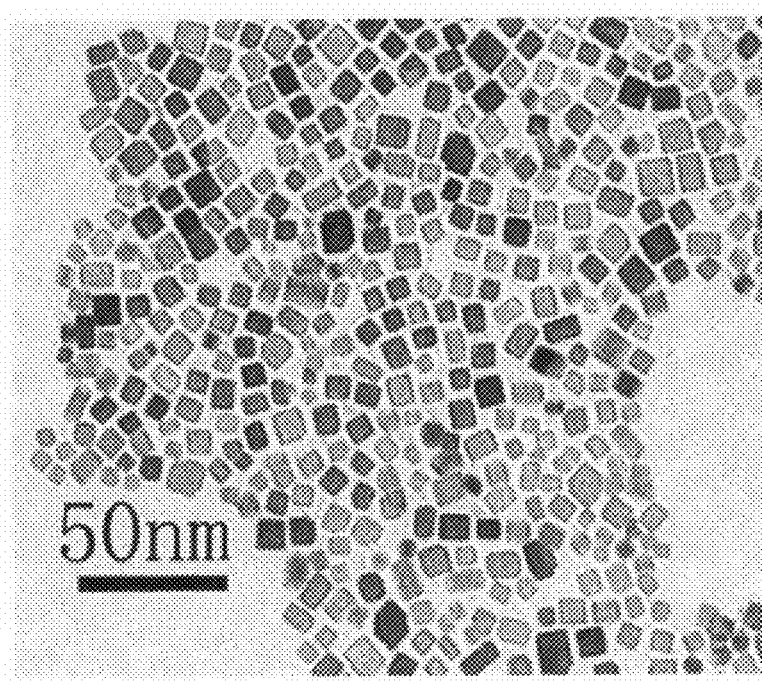
FIG. 6 is a TEM image of cerium dioxide nanocrystal according to a sixth embodiment.

0.2 g of cerium nitrate ($Ce(NO_3)_3 \cdot 6H_2O$) solid is dissolved in 10 milliliters (ml) octadecyl amine, and a mixture is achieved. The mixture is agitated and reacted at a temperature of 120° C. for 2 m, and a reactant is achieved. The reactant is filled into a reaction chamber and is crystallised therein at a temperature of 200° C. for 24 h. Thereafter, the reactant is cooled to the temperature of 80° C., and a deposit is achieved. The deposit is washed with ethanol and dried at the temperature of 60° C. Referring to FIG. 6, a cerium dioxide ($CeO_2$) nanocrystal with a diameter of about 10 nm is achieved.

EXAMPLE 7

Figure 7:
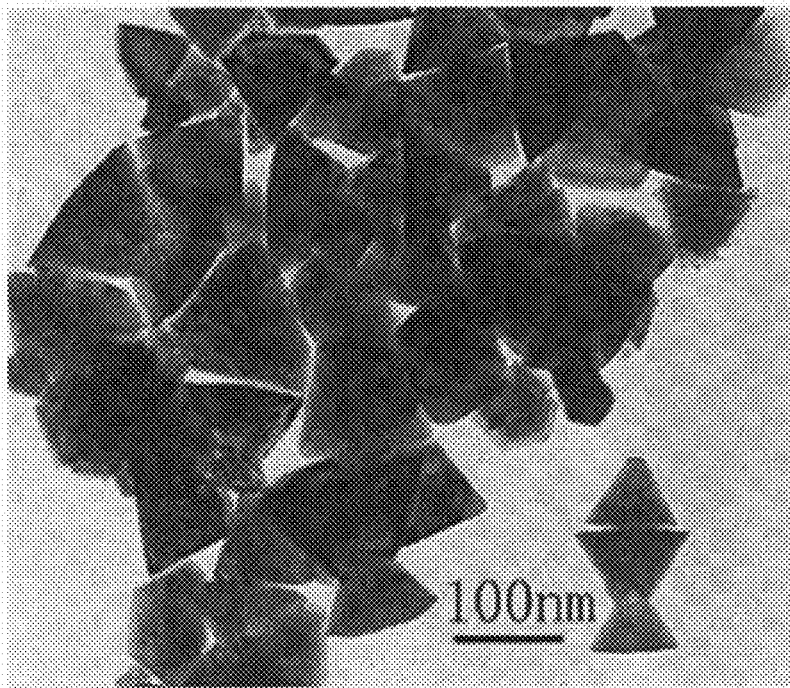
FIG. 7 is a TEM image of zinc oxide nanocrystal according to a seventh embodiment.

0.2 g of zinc nitrate ($Zn(NO_3)_2 \cdot 6H_2O$) solid is dissolved in 10 ml octadecyl amine, and a mixture is achieved. The mixture is agitated and reacted at a temperature of 200° C. for 1 h and then is cooled to the temperature of 80° C., and a deposit is achieved. The deposit is washed with ethanol and dried at the temperature of 60° C. Referring to FIG. 7, a zinc oxide (ZnO) nanocrystal with a diameter of about 100 nm is achieved.

EXAMPLE 8

Figure 8:
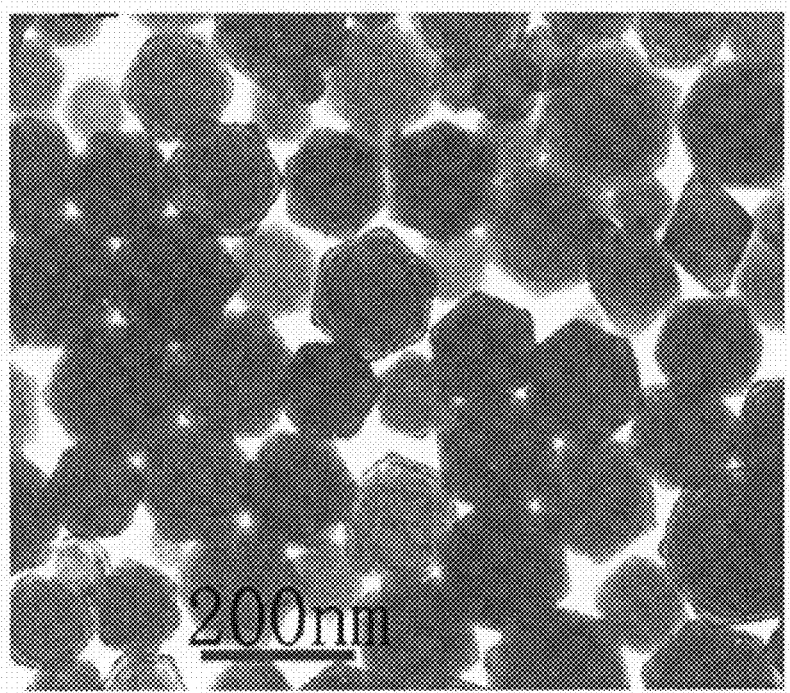
FIG. 8 is a TEM image of cobaltous oxide nanocrystal according to an eighth embodiment.

0.5 g of cobalt nitrate ($Co(NO_3)_2 \cdot 6H_2O$) (i.e., cobalt (II) nitrate) solid is dissolved in 10 ml octadecyl amine, and a mixture is achieved. The mixture is agitated and reacted at a temperature of 250° C. for 20 m and then is cooled to the temperature of 80° C., and a deposit is achieved. The deposit is washed with ethanol and dried at the temperature of 60° C. Referring to FIG. 8, a cobaltous oxide (CoO) (i.e., cobalt (II) oxide) nanocrystal with a diameter of about 150 nm is achieved.

EXAMPLE 9

Figure 9:
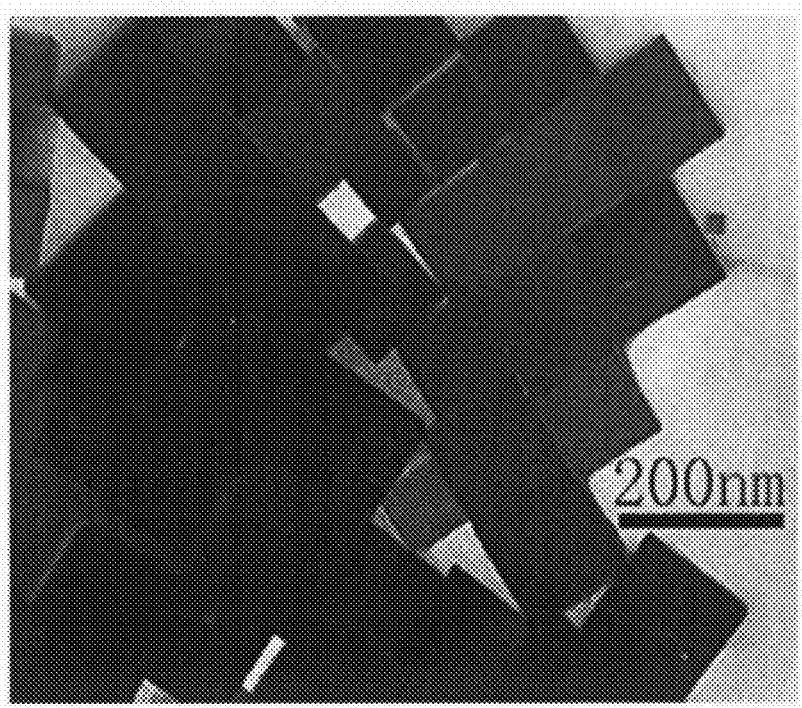
FIG. 9 is a TEM image of cobalt oxide nanocrystal according to a ninth embodiment.

1 g of cobaltous nitrate ($Co(NO_3)_3 \cdot 6H_2O$) solid is dissolved in 10 milliliters (ml) octadecyl amine, and a mixture is achieved. The mixture is agitated and reacted at a temperature of 120° C. for 5 m, and a reactant is achieved. The reactant is filled into a reaction chamber and is crystallised therein at a temperature of 200° C. for 24 h. Thereafter, the reactant is cooled to the temperature of 80° C., and a deposit is achieved. The deposit is washed with ethanol and dried at the temperature of 60° C. Referring to FIG. 9, a cobalt oxide ($Co_3O_4$) nanocrystal with a diameter of about 120 nm is achieved.

Figure 10:
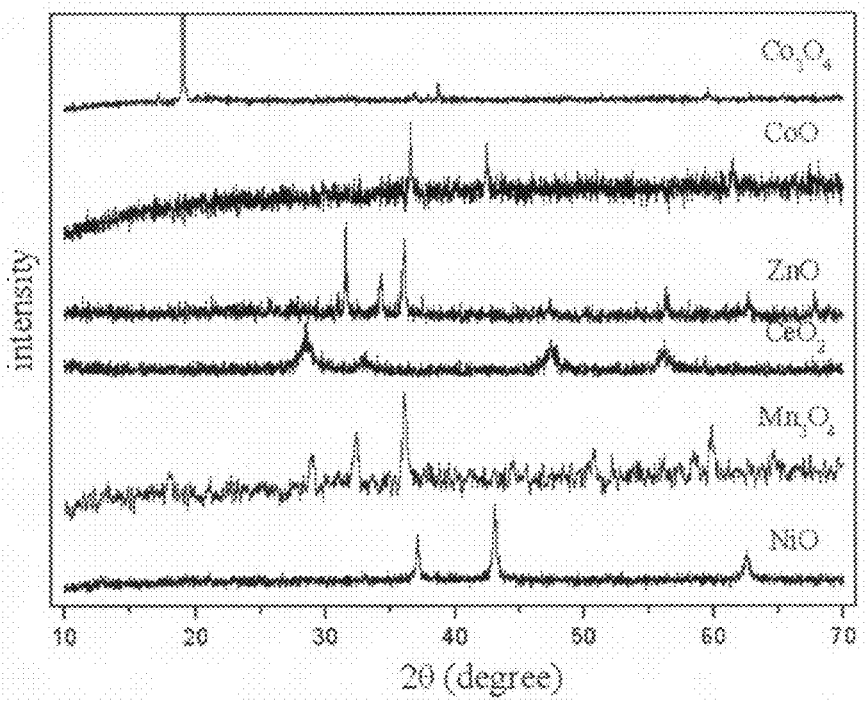
FIG. 10 is an X-ray diffraction (XRD) image of metal oxide nanocrystal according to the above embodiments.

Referring to FIG. 10, the metal oxides, according to the above embodiments, have perfect or at least near-perfect morphologies.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A method for making a metal oxide comprising:
   mixing a metal nitrate with a solvent comprising octadecyl amine, at a ratio from about 0.1 gram to about 1 gram of the metal nitrate for every 10 ml of the octadecyl amine, and achieving a mixture;
   agitating the mixture at a reaction temperature for a reaction period;
   cooling the mixture to a cooling temperature to achieve a metal oxide nanocrystal deposit;
   washing the metal oxide nanocrystal deposit with an organic solvent; and
   drying the metal oxide nanocrystal deposit at a drying temperature.

2. The method for making the metal oxide as claimed in claim 1, further comprising a crystallizing step between the agitating the mixture and the cooling the mixture, wherein the crystallizing step comprises: filling the mixture into a reaction chamber; and crystallizing the mixture at a crystallizing temperature for a crystallizing period; wherein the crystallizing temperature is in a range from about 180° C. to about 220° C., and the crystallizing period is in a range from about 20 hours to about 24 hours.

3. The method for making the metal oxide as claimed in claim 1, wherein a reaction temperature is in a range from about 120° C. to about 300° C.

4. The method for making the metal oxide as claimed in claim 1, wherein the cooling temperature is in a range from about 70° C. to about 90° C.

5. The method for making the metal oxide as claimed in claim 3, wherein the reaction period is in a range from about 1 minute to about 60 minutes.

6. The method for making the metal oxide as claimed in claim 1, wherein the metal nitrate is a cerous nitrate, and the metal oxide nanocrystal is a cerium oxide nanocrystal.

7. The method for making the metal oxide as claimed in claim 6, wherein the reaction temperature is about 250° C., the reaction period is about 8 minutes, and the cooling temperature is about 80° C.

8. The method for making the metal oxide as claimed in claim 6, further comprising a crystallizing step between the agitating the mixture and the cooling the mixture, wherein the crystallizing step comprises filling the mixture into a reaction chamber, and crystallizing the mixture at a crystallizing temperature of about 200° C. for about 24 hours, the reaction temperature is about 120° C., the reaction period is about 2 minutes, the cooling temperature is about 80° C., to achieve the cerium oxide nanocrystal in a nanocube shape.

9. The method for making the metal oxide as claimed in claim 1, wherein the metal nitrate is a nickel nitrate, the metal oxide nanocrystal is a nickel oxide nanocrystal, the reaction temperature is about 180° C., the reaction period is about 10 minutes, and the cooling temperature is about 80° C.

10. The method for making the metal oxide as claimed in claim 1, wherein the metal nitrate is a manganous nitrate, the metal oxide nanocrystal is a mangano-manganic oxide nanocrystal, the reaction temperature is about 200° C., the reaction period is about 10 minutes, and the cooling temperature is about 80° C.

11. The method for making the metal oxide as claimed in claim 1, wherein the metal nitrate is a zinc nitrate, the metal oxide nanocrystal is a zinc oxide nanocrystal, the reaction temperature is about 200° C., the reaction period is about 1 hour, and the cooling temperature is about 80° C.

12. The method for making the metal oxide as claimed in claim 1, wherein the metal nitrate is a cobalt nitrate, the metal oxide nanocrystal is a cobaltous oxide nanocrystal, the reaction temperature is about 250° C., the reaction period is about 20 minutes, and the cooling temperature is about 80° C.

13. The method for making the metal oxide as claimed in claim 1, further comprising a crystallizing step between the agitating the mixture and the cooling the mixture, wherein the crystallizing step comprises: filling the mixture into a reaction chamber; and crystallizing the mixture at a crystallizing temperature of about 200° C. for about 24 hours, the metal nitrate is a cobaltous nitrate, the metal oxide nanocrystal is a cobalt oxide nanocrystal, the reaction temperature is about 120° C., and the reaction period is about 5 minutes, the cooling temperature is about 80° C.

14. The method for making the metal oxide as claimed in claim 1, further comprising a step of changing the concentration of the metal nitrate in the mixture.

15. The method for making the metal oxide as claimed in claim 1, wherein the mixture consists of the metal nitrate and the octadecyl amine.

16. A method for making a metal oxide, comprising:
mixing a metal nitrate with a solvent comprising octadecyl amine to achieve a mixture;
agitating the mixture at a reaction temperature for a reaction period, thereby causing a reaction of the mixture;
cooling the mixture to a cooling temperature to achieve a metal oxide nanocrystal deposit;
washing the metal oxide nanocrystal deposit with an organic solvent; and
drying the metal oxide nanocrystal deposit at a drying temperature;
wherein the metal nitrate is a cerous nitrate, and the metal oxide nanocrystal is a cerium oxide nanocrystal; and the reaction temperature is about 250° C., the reaction period is about 8 minutes, and the cooling temperature is about 80° C.

17. A method for making a metal oxide, comprising:
mixing a metal nitrate with a solvent comprising octadecyl amine to achieve a mixture;
agitating the mixture at a reaction temperature for a reaction period, wherein the reaction temperature is in a range from about 120° C. to about 300° C., the reaction period is in a range from about 1 minute to about 5 minutes;
placing the mixture into a reaction chamber, and crystallizing the mixture for a crystallizing period at a crystallizing temperature, wherein the crystallizing temperature is in a range from about 180° C. to about 220° C., and the crystallizing period is in a range from about 20 hours to about 24 hours;
cooling the mixture to a cooling temperature to achieve a metal oxide nanocrystal deposit;
washing the metal oxide nanocrystal deposit with an organic solvent; and
drying the metal oxide nanocrystal deposit at a drying temperature.

18. The method for making the metal oxide as claimed in claim 17, wherein the metal nitrate and the octadecyl amine is mixed at a ratio from about 0.1 gram to about 1 gram of the metal nitrate for every 10 ml of the octadecyl amine.

19. The method for making the metal oxide as claimed in claim 17, wherein the metal nitrate is a cerous nitrate, the reaction temperature is about 120° C., the reaction period is about 2 minutes, the crystallizing temperature is about 200° C., the crystallizing period is about 24 hours, and the cooling temperature is about 80° C.

* * * * *